US011831226B2

(12) United States Patent
Mongeau et al.

(10) Patent No.: US 11,831,226 B2
(45) Date of Patent: Nov. 28, 2023

(54) COOLING OF ELECTRICAL GENERATORS IN WIND TURBINES

(71) Applicant: Vestas Wind Systems A/S, Aarhus N. (DK)

(72) Inventors: Peter Mongeau, Center Conway, NH (US); Mustafa Gündüz, Lübeck (DE)

(73) Assignee: Vestas Wind Systems A/S, Aarhus N (DK)

( * ) Notice: Subject to any disclaimer, the term of this patent is extended or adjusted under 35 U.S.C. 154(b) by 255 days.

(21) Appl. No.: 17/420,726

(22) PCT Filed: Jan. 8, 2020

(86) PCT No.: PCT/DK2020/050004
§ 371 (c)(1),
(2) Date: Jul. 6, 2021

(87) PCT Pub. No.: WO2020/143887
PCT Pub. Date: Jul. 16, 2020

(65) Prior Publication Data
US 2022/0069669 A1 Mar. 3, 2022

Related U.S. Application Data

(60) Provisional application No. 62/790,555, filed on Jan. 10, 2019.

(30) Foreign Application Priority Data

Jan. 30, 2019 (DK) .......................... PA 2019 70066

(51) Int. Cl.
*H02K 9/18* (2006.01)
*H02K 11/25* (2016.01)
(Continued)

(52) U.S. Cl.
CPC ................. *H02K 9/18* (2013.01); *F03D 9/25* (2016.05); *F03D 13/20* (2016.05); *F03D 80/60* (2016.05);
(Continued)

(58) Field of Classification Search
CPC ........ H02K 9/18; H02K 1/185; H02K 7/1838; H02K 11/25; F03D 9/25; F03D 13/20;
(Continued)

(56) References Cited

U.S. PATENT DOCUMENTS 3,652,881 A * 3/1972 Albright .................. H02K 9/18
310/64
7,878,236 B1 * 2/2011 Breen ...................... F24F 11/83
165/47

(Continued)

FOREIGN PATENT DOCUMENTS

| CN | 104379926 A | 2/2015 |
| DE | 19919040 A1 | 9/2000 |

(Continued)

OTHER PUBLICATIONS

Danish Patent and Trademark Office, Search and Examination Report in PA 2019 70066, dated Jul. 3, 2019.
(Continued)

*Primary Examiner* — Charles Reid, Jr.
(74) *Attorney, Agent, or Firm* — Wood Herron & Evans LLP (57) ABSTRACT

In a first aspect of the invention there is provided a generator for a wind turbine defining a central generator axis. The generator includes a stator support frame and an environmental conditioning module removably attached to the stator support frame. The environmental conditioning module includes a heat exchanger and an air mover supported by a module housing. The environmental conditioning module (Continued)

further includes fluid interface connections associated with the heat exchanger, the fluid interface connections being releasably connectable to a fluid supply system associated with the heat exchanger, and electrical interface connections associated with the air blower, the electrical interface connections being releasably connectable to an electrical supply system associated with the air mover.

16 Claims, 9 Drawing Sheets

(51) Int. Cl.
    *F03D 9/25*       (2016.01)
    *F03D 13/20*     (2016.01)
    *F03D 80/60*     (2016.01)
    *H02K 1/18*      (2006.01)
    *H02K 7/18*      (2006.01)

(52) U.S. Cl.
    CPC ........... *H02K 1/185* (2013.01); *H02K 7/1838* (2013.01); *H02K 11/25* (2016.01); *F05B 2220/706* (2013.01); *F05B 2240/912* (2013.01)

(58) Field of Classification Search
    CPC ............... F03D 80/60; F05B 2220/706; F05B 2240/912
    USPC .................................................... 290/44, 55
    See application file for complete search history.

(56) References Cited

U.S. PATENT DOCUMENTS

| | | | | |
|---|---|---|---|---|
| 8,011,896 | B2* | 9/2011 | Wu | ....................... F04D 25/166 |
| | | | | 290/55 |
| 10,907,616 | B2* | 2/2021 | Kreutzfeldt | ............. F03D 17/00 |
| 2008/0257538 | A1* | 10/2008 | Persson | ............... F24D 19/1051 |
| | | | | 165/287 |
| 2010/0102652 | A1 | 4/2010 | Booth et al. | |
| 2010/0102657 | A1 | 4/2010 | Booth et al. | |
| 2010/0118492 | A1 | 5/2010 | Larsen | |
| 2011/0000640 | A1* | 1/2011 | Jensen | .................. F28D 7/1615 |
| | | | | 165/47 |
| 2011/0272949 | A1* | 11/2011 | Matsuo | ..................... F03D 9/25 |
| | | | | 290/55 |
| 2014/0110947 | A1* | 4/2014 | Mongeau | ............... H02K 7/104 |
| | | | | 290/55 |
| 2014/0219801 | A1* | 8/2014 | Nyvad | .................... F03D 80/60 |
| | | | | 416/146 R |
| 2016/0020667 | A1 | 1/2016 | Jensen | |
| 2017/0127474 | A1* | 5/2017 | Lindley | ................ H05B 1/0233 |

FOREIGN PATENT DOCUMENTS

| | | |
|---|---|---|
| EP | 2163761 A1 | 3/2010 |
| EP | 2752578 A1 | 7/2014 |
| EP | 3054569 A1 | 8/2016 |
| EP | 3179605 A1 | 6/2017 |
| WO | 2013111259 A1 | 8/2013 |
| WO | 2014023835 A1 | 2/2014 |
| WO | 2017207537 A1 | 12/2017 |

OTHER PUBLICATIONS

European Patent Office, International Search Report and Written Opinion in PCT Application No. PCT/DK2020/050004, dated Apr. 14, 2020.

China National Intellectual Property Administration, office action issued in corresponding Chinese Application No. 202080017891.5, dated Apr. 26, 2023, with English translation.

* cited by examiner

COOLING OF ELECTRICAL GENERATORS IN WIND TURBINES

TECHNICAL FIELD

The present invention relates generally to generators for wind turbines and more specifically to cooling apparatus for such generators.

BACKGROUND

In modern commercial-scale wind turbines, it is a particular challenge to ensure the power generation components are cooled sufficiently. For example, a generator located in a nacelle of a wind turbine creates a great deal of thermal energy due to the high currents running through the field windings. Space in the nacelle is limited so it can be challenging to ensure that there is sufficient room in the nacelle, and in the generator package, for an adequate cooling system.

It is known to implement one or more heat exchangers in the nacelle of the wind turbine. Such heat exchangers may be located within the stator as in EP3054569 A1, or mounted to the generator housing as in WO2017207537 A1. Access to such generator heat exchangers may be limited in an assembled nacelle which can make maintenance work on the heat exchanger problematic. In some heat exchangers the design may be such that the entire heat exchanger must be disassembled from the generator in order to service a single component, complicating maintenance work further.

Alternatively, heat exchangers may be located in the nacelle away from the generator and connected to the generator by ducting to provide cooling to the generator components. Such ducting can be bulky and must be planned into the architecture of the entire nacelle, thereby compromising space for other components.

It is against this background that the present invention has been developed.

SUMMARY OF THE INVENTION

In a first aspect of the invention there is provided a generator for a wind turbine defining a central generator axis. The generator comprises a stator support frame and an environmental conditioning module removably attached to the stator support frame. The environmental conditioning module comprises a heat exchanger and an air mover supported by a module housing. The environmental conditioning module further comprises fluid interface connections associated with the heat exchanger, the fluid interface connections being releasably connectable to a fluid supply system associated with the heat exchanger, and electrical interface connections associated with the air mover, the electrical interface connections being releasably connectable to an electrical supply system associated with the air mover.

The environmental conditioning module may further comprise a plurality of separable sub-assemblies comprising at least a heat exchanger sub-assembly and an air mover sub-assembly. At least one of the sub-assemblies may be independently separable from the environmental conditioning module with the environmental conditioning module attached in situ to the stator support frame.

At least one of the sub-assemblies may comprise an electric motor for driving the air mover and the electric motor may be independently separable from the environmental conditioning module with the environmental conditioning module attached in situ to the stator support frame. The electric motor may form part of the air mover sub-assembly.

The heat exchanger may form at least part of an outer surface of the module housing. Further, the heat exchanger may be substantially planar, and the environmental conditioning module may be positioned on the stator support frame so that the heat exchanger forms part of a radially innermost surface of the module housing with respect to the central generator axis.

The module housing may comprise an access cover. The access cover may be removable or openable to provide maintenance access to an interior of the module housing. The module housing may form at least part of an outer surface of the generator.

The generator may be substantially cuboidal in shape, thereby defining six faces. A first face of the generator may be located at a driven end of the generator and a second face may be located at an opposing non-driven end of the generator. At least one environmental conditioning module may be located substantially at a vertex of the generator extending substantially between the first and second faces. An environmental conditioning module may be located substantially at each vertex of the generator extending substantially between the first and second faces.

The heat exchanger may be a liquid to air type heat exchanger and the air mover may comprise a fan. The fan may be a centrifugal fan arranged within the module housing so that a rotational axis of the fan is substantially parallel to the central generator axis.

The environmental conditioning module may further comprise a temperature sensor and electrical interface connections associated with the temperature sensor, the electrical interface connections being releasably connectable to an electrical supply system associated with the temperature sensor.

In another aspect of the invention there is provided a method of cooling a generator for a wind turbine, the generator having features as described above. The method comprises operating the generator and operating the air mover of an environmental cooling module to cause air from an interior of the generator to be drawn into the module housing through the heat exchanger and subsequently returned to the interior of the generator. The airflow through the environmental conditioning module preferably forms a closed loop such that at least a portion of the air returned to the interior of the generator is drawn back into the module.

In a further aspect of the invention there is provided wind turbine comprising a wind turbine tower, a nacelle rotatably coupled to the tower, a rotating hub mounted to the nacelle, and a plurality of wind turbine blades coupled to the hub, wherein the nacelle comprises a generator as described above.

BRIEF DESCRIPTION OF THE DRAWINGS

Non-limiting examples of the present invention will now be described with reference to the accompanying drawings, in which.

DETAILED DESCRIPTION

A specific embodiment of the present invention will now be described in which numerous features will be discussed in detail in order to provide a thorough understanding of the inventive concept as defined in the claims. However, it will be apparent to the skilled person that the invention may be put in to effect without the specific details and that in some instances, well known methods, techniques and structures have not been described in detail in order not to obscure the invention unnecessarily.

Figure 1:
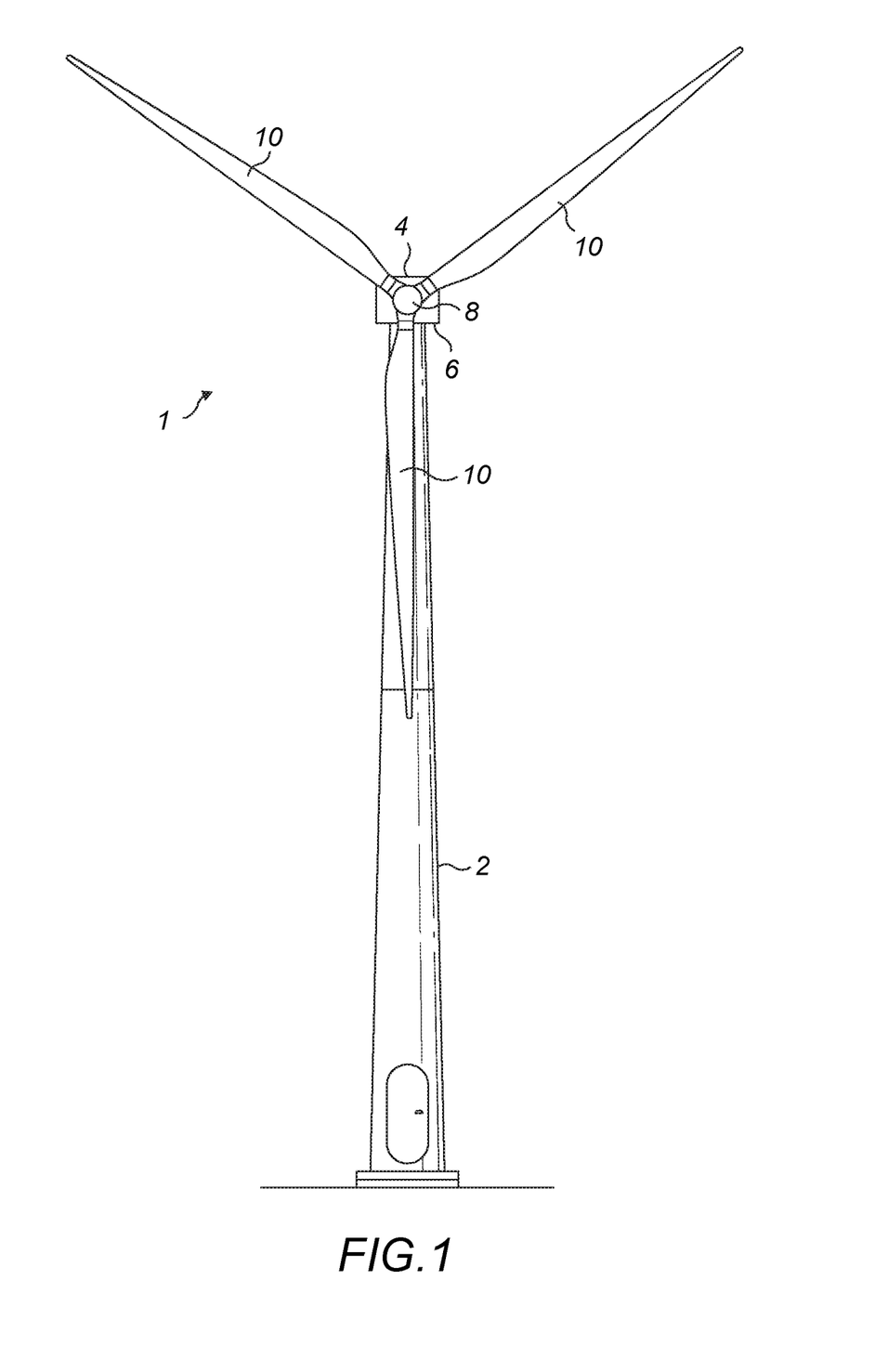
FIG. 1 is a schematic perspective view of a horizontal axis wind turbine.

In order to place the embodiments of the invention in a suitable context, reference will firstly be made to FIG. 1, which illustrates a typical Horizontal Axis Wind Turbine (HAWT) 1 in which a generator for a wind turbine according to an embodiment of the invention may be implemented. Although this particular image depicts an on-shore wind turbine 1, it will be understood that equivalent features will also be found on off-shore wind turbines. In addition, although the wind turbines are referred to as 'horizontal axis', it will be appreciated by the skilled person that for practical purposes, the axis is usually slightly inclined to prevent contact between the rotor blades and the wind turbine tower in the event of strong winds.

The wind turbine 1 comprises a tower 2, a nacelle 4 rotatably coupled to the top of the tower 2 by a yaw system 6, a rotating hub 8 mounted to the nacelle 4 and a plurality of wind turbine rotor blades 10 coupled to the hub 8. The nacelle 4 and rotor blades 10 are turned and directed into the wind direction by the yaw system 6.

Figure 2:
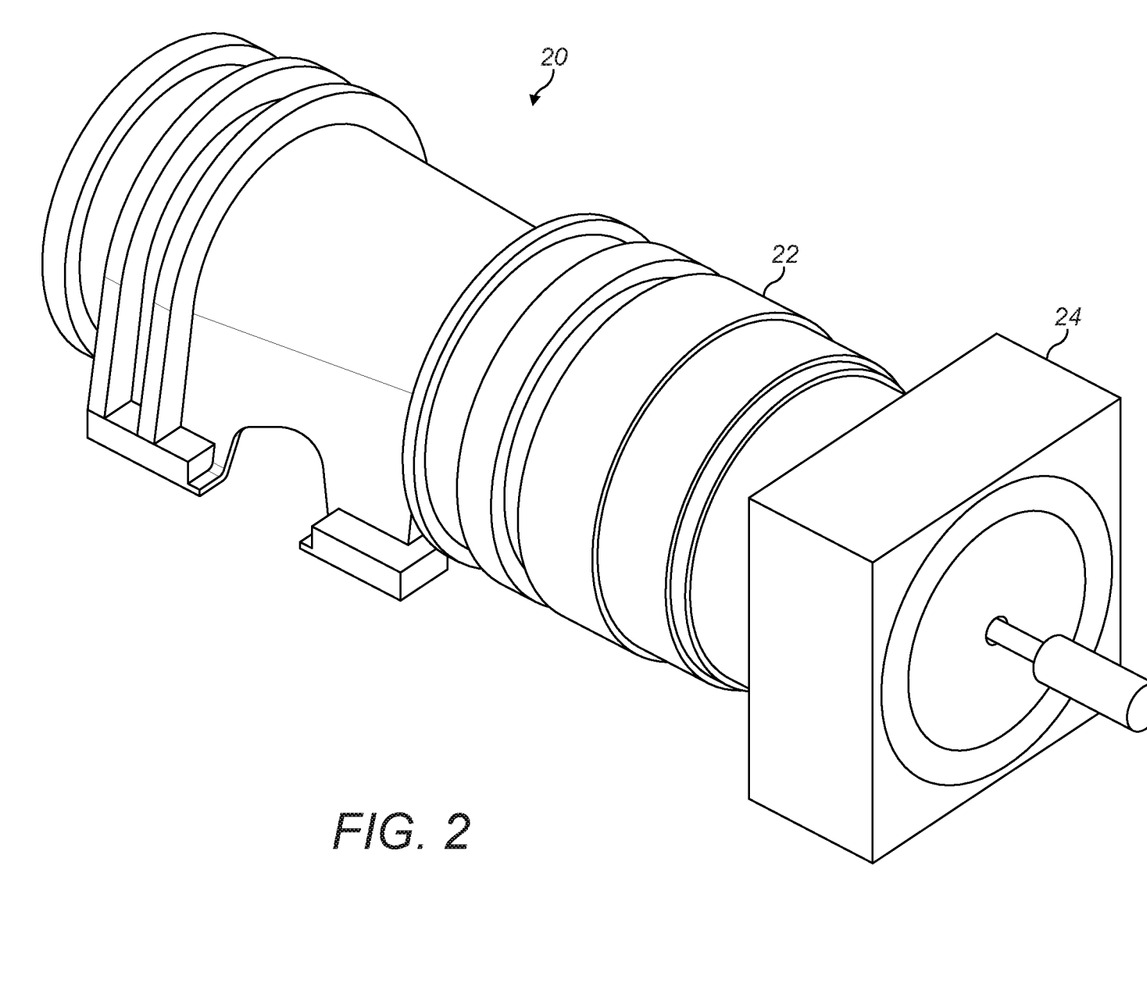
FIG. 2 is a schematic perspective view of functional components of a nacelle of the wind turbine.

The nacelle 4 houses many functional components of the wind turbine 1, including the generator, gearbox, drive train and rotor brake assembly, as well as convertor equipment for converting the mechanical energy of the wind into electrical energy for provision to an electrical grid distribution system. With reference to FIG. 2, the nacelle 4 may include a shaft housing 20, a gearbox 22 and a generator 24. A main shaft extends through the shaft housing 20, and is supported on bearings (not shown). The main shaft is connected to, and driven by, the hub 8 and provides input drive to the gearbox 22. The gearbox 22 steps up the rotational speed of the low speed main shaft via internal gears (not shown) and drives a gearbox output shaft. The gearbox output shaft in turn drives the generator 24, which converts the rotation of the gearbox output shaft into electricity. The electricity generated by the generator 24 may then be converted by other components (not shown) as required before being supplied to an appropriate consumer, for example an electrical grid distribution system. So-called "direct drive" wind turbines that do not use gearboxes 22 are also known. The gearbox 22 may therefore be considered optional.

Figure 3:
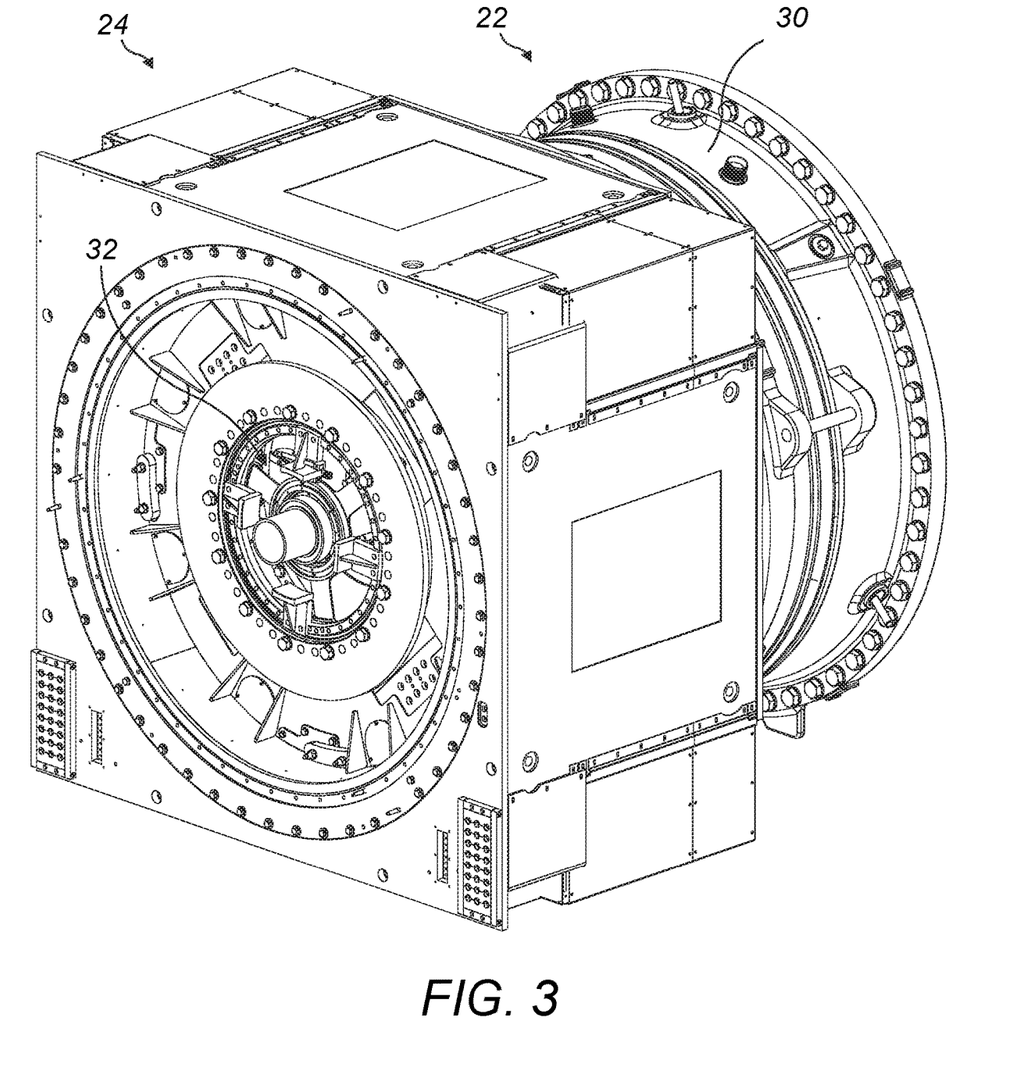
FIG. 3 is a schematic perspective view of a generator for a wind turbine and part of a gearbox.
Figure 4:
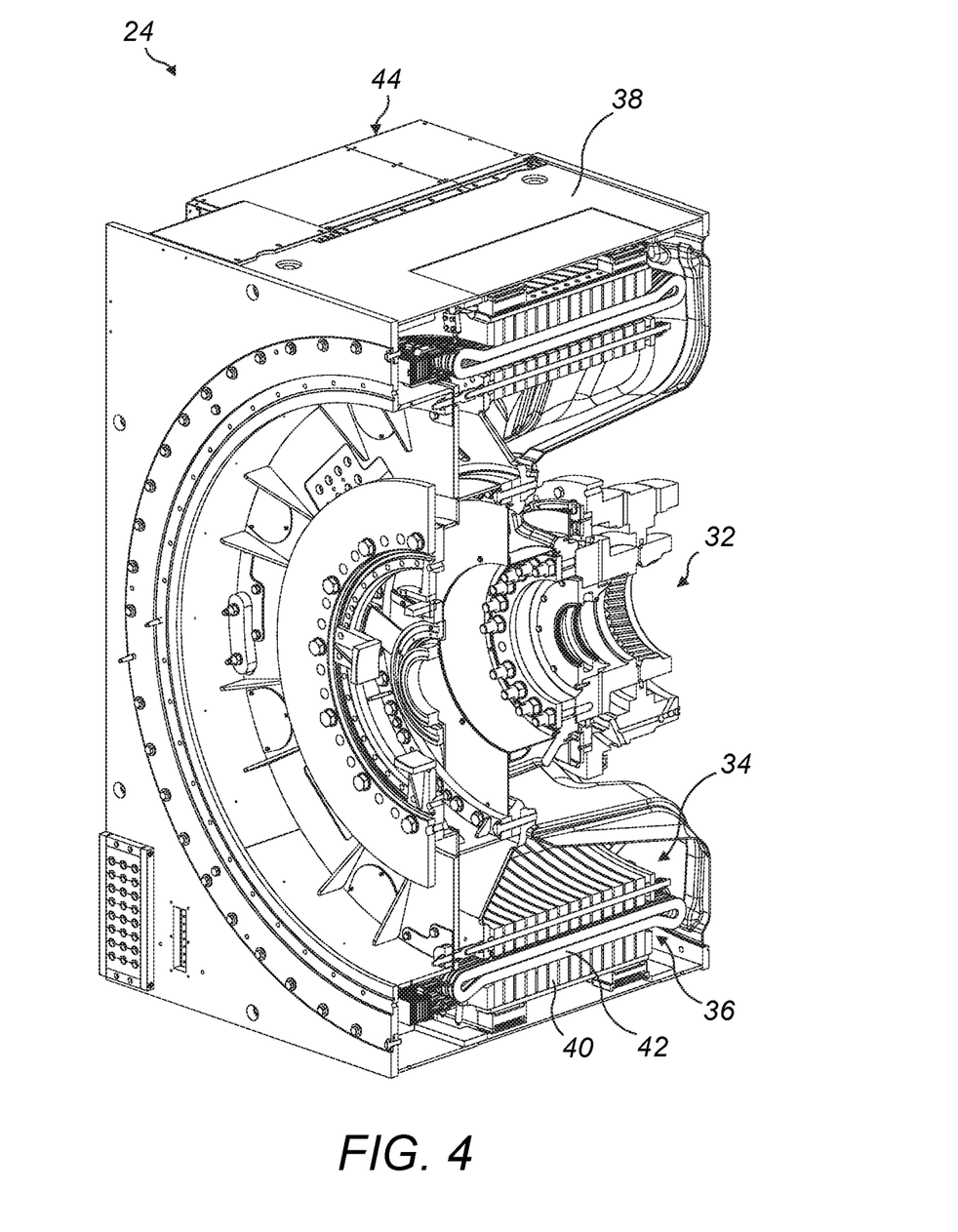
FIG. 4 is a schematic cross-sectional view of the generator.
Figure 5:
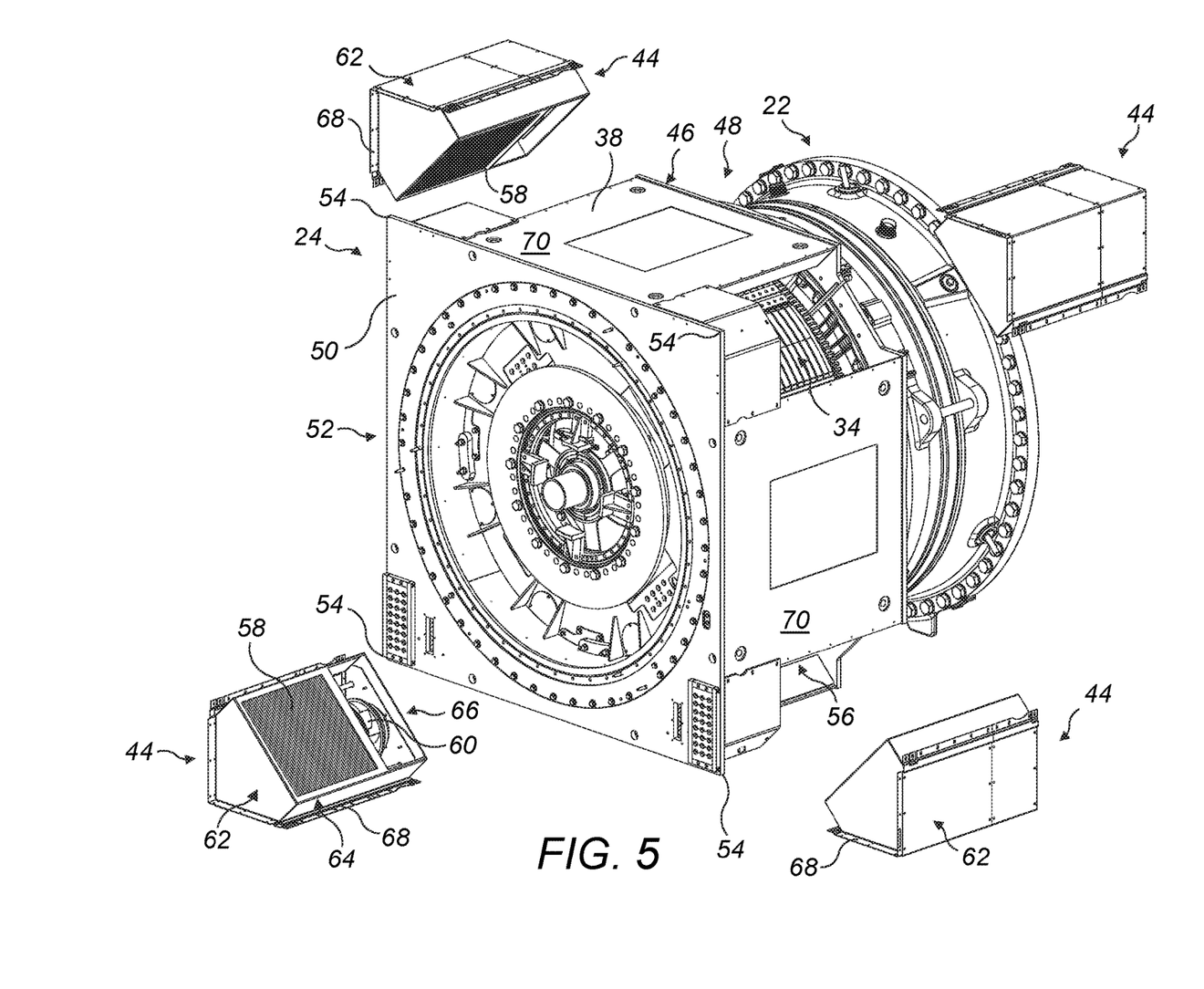
FIG. 5 is a schematic perspective exploded view of the generator.

The gearbox 22 and generator 24 may be coupled together in an integrated unit. One end of such an integrated unit is shown in FIGS. 3-5 as a specific example. In these Figures, the generator 24 is shown coupled to the gearbox 22 which is shown in partial view only. The generator 24 and the gearbox 22 are separate sub-assemblies that themselves have been coupled together to create a single assembly that is comparatively compact. Part of the gearbox 22 is illustrated on the right hand side of the Figures and the generator 24 is illustrated on the left hand side of the Figures.

With reference firstly to the gearbox 22, a gearbox housing 30 is generally cylindrical in form and is oriented such that its major rotational axis is horizontal, in the orientation of the drawings. The cylindrical configuration of the gearbox housing 30 is due to the specific type of gearbox 22 that is used in the illustrated embodiment, which is an epicyclic gearbox. As the skilled person would know, an epicyclic gearbox comprises a series of planet gears that are arranged about a central sun gear, and which collectively are arranged within an encircling ring gear. The ratio of the number of teeth between the ring gear, the planet gear and the sun gears determines the gear ratio of the gearbox. For clarity, fine detail of the gearbox 22 will not be described in further detail here as the gearbox 22 is not the principal subject of the invention. Suffice to say that other gearbox configurations could also be used, although it is currently envisaged that an epicyclic gearbox provides an elegant solution fit for the confines of a wind turbine nacelle 4.

Turning now to the generator 24, the output shaft of the gearbox 22 interfaces with a rotor 32 of the generator 24. As such, the major axis of the gearbox output shaft defines the rotational axis of the generator 24.

The generator 24 in the illustrated embodiment is an IPM (interior permanent magnet) electric machine having an external stator 34 which surrounds the rotor 32. The stator 34 includes a stator core 36. As best shown in FIG. 4, the stator core 36 comprises a plurality of lamina 40 stacked in an axial direction of the generator 24. Field windings 42 of a conductive material such as copper are wound around the lamina 40 of the stator core 36. An electrical current is induced in the field windings 42 of the stator core 36 by a fluctuating magnetic field caused by the magnets attached to the rotor 32 which is rotated in use by wind driving the rotor blades 10. Although the example described herein refers to an interior permanent magnet machine, it will be appreciated that in other examples other types of generator 24 may be used, for example the generator 24 may comprise a rotor 32 having an electro-magnet instead of permanent magnets.

As mentioned by way of background, the high currents running through the stator field windings 42 result in the release of high amounts of thermal energy due to the inherent electrical resistance in said field windings 42. The efficiency of the generator 24 is directly related to the temperature of critical generator components such as the stator core 36 and its field windings 42. To provide cooling to the generator components at least one environmental conditioning module (ECM) 44 is removably attached to the stator support frame 38.

Figure 6:
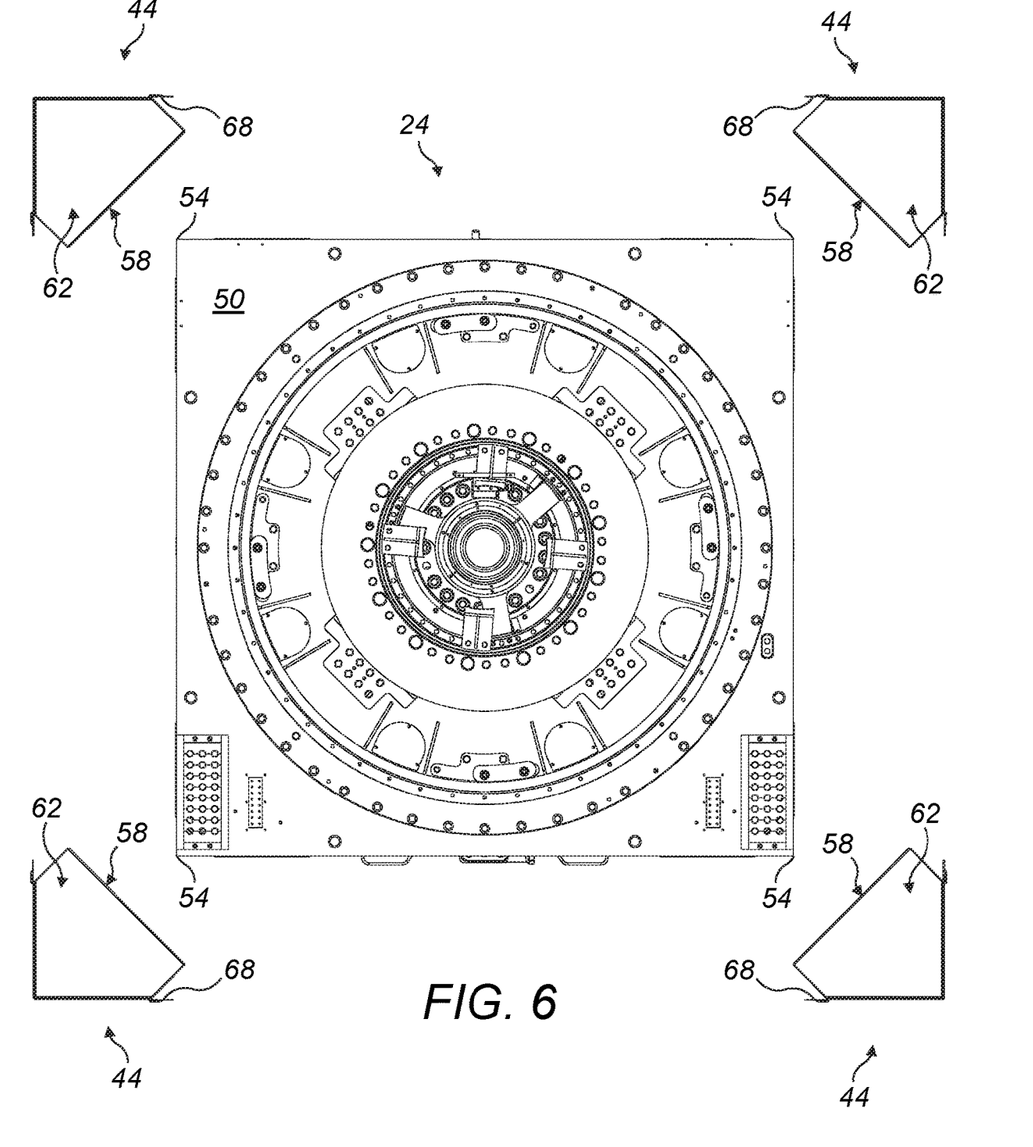
FIG. 6 is a schematic exploded view in a plan view orientation of the generator.

Referring now to the schematic exploded view of the integrated gearbox 22 and generator 24 shown in FIGS. 5 and 6, the generator 24 in the present example comprises four environmental conditioning modules 44. Although four environmental conditioning modules 44 are depicted in this example, it will be understood that any number of one or more environmental conditioning modules 44 may be incorporated in a generator 24 without departing from the scope of the invention as defined in the claims below.

Each of the environmental conditioning modules 44 of the generator 24 are located radially outboard of the stator 34 with respect to the central generator axis. In the specific example described herein, the generator 24 is substantially cuboidal in shape, thereby defining six faces. A first face 46 of the generator 24 is located at a driven end 48 of the generator 24, i.e. the end of the generator 24 closest to the gearbox 22, and a second face 50 is located at an opposing non-drive end 52 of the generator 24. A plurality of vertices 54 notionally extend substantially between the first and second faces 46, 50 of the generator 24 and at least one ECM 44 is located substantially at such a vertex 54 of the generator 24. In the present example, the generator 24 comprises four vertices 54 extending between the first and second faces 46, 50 and an environmental conditioning module 44 is located substantially at each of said vertices 54. It will be appreciated that although each of the vertices 54 of the generator 24 in the present example comprises an ECM 44, in some examples only one vertex 54 of the generator 24 may comprise an ECM 44.

The location of the four environmental conditioning modules 44 in the present example optimizes the airflow within the generator 24 and reduces the volumetric space requirement of the generator 24 in the nacelle 4. Implementing the environmental conditioning modules 44 in the generator 24 results in a closed loop cooling system in which air is cycled within the interior 56 of the generator 24. This negates pumping losses and other inefficiencies with known cooling systems implemented external to the generator 24.

As shown in the exploded views of FIGS. 5 and 6, the environmental conditioning modules 44 are modular sub-assemblies that can be independently removed from the generator 24. The ECM 44 comprises a heat exchanger 58 and an air mover 60 supported by a module housing 62. In this specific example, the air mover 60 comprises a centrifugal fan driven by an electric motor 63 (shown in FIG. 7). Each environmental conditioning module 44 additionally comprises all of the required ancillary connections for the components housed in the ECM 44. As such, the ECM 44 may be removed from the generator 24 as a complete unit without complex and time consuming disassembly of the generator 24.

The environmental conditioning module 44 comprises a plurality of separable sub-assemblies wherein at least one of the sub-assemblies is independently separable from the ECM 44 with the ECM 44 attached in situ to the stator support frame 38. In this example, the ECM 44 comprises a heat exchanger sub-assembly 64 and an air mover sub-assembly 66 as will be described below in more detail with reference to FIGS. 7 and 8. In the present example, the air mover sub-assembly 66 is situated at the drive end 48 of the generator when the ECM 44 is attached to the generator 24. It will however be appreciated that in some examples the air mover sub-assembly 66 may equally be situated at the opposite end of the ECM 44, i.e. at the non-drive end 52 of the generator 24 or in any other suitable position.

Each ECM 44 is attached to the stator support frame 38 by mechanical fastening means (not shown). The fastening means may for example comprise a nut and bolt assembly to form a compression joint fixing the ECM 44 to the stator support frame 38 via a mounting flange 68 of the ECM 44. Notably, the environmental conditioning modules 44 are attached to the stator support frame 38 by non-permanent fastening means that enable simple separation and re-attachment of the ECM 44. In some examples, a sealing gasket (not shown) may be included between the ECM mounting flange 68 and a respective outer surface 70 of the generator 24. With the ECM 44 assembled to the stator support frame 38, the module housing 62 forms at least part of an outer surface 70 of the generator 24.

Figure 7:
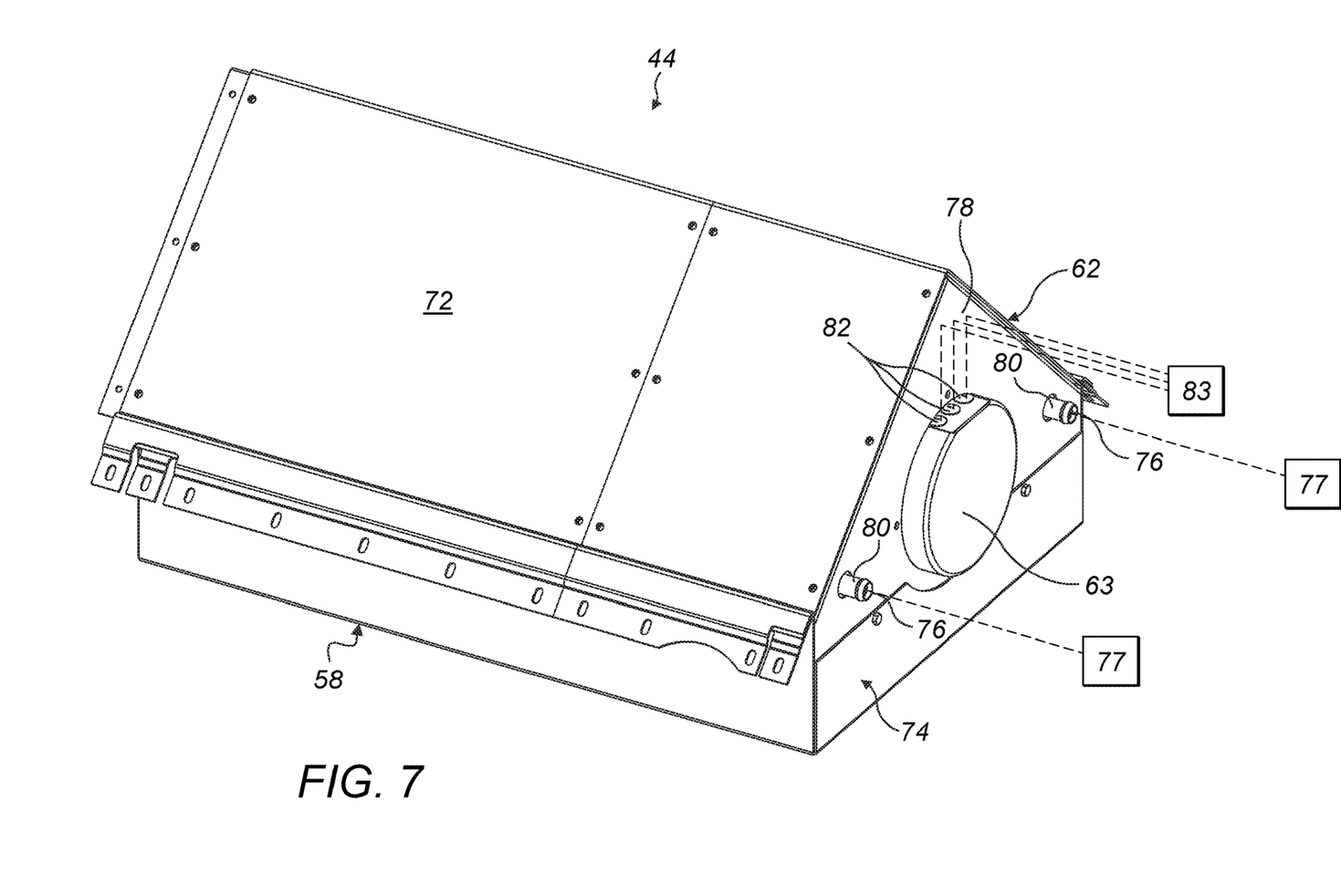
FIG. 7 is a schematic perspective view of an environmental conditioning module of the generator.

FIG. 7 shows a schematic perspective view of an environmental conditioning module 44. The module housing 62 comprises an access cover 72 which is removable to provide access to an interior of the module housing 62 for maintenance. In an alternative example, the access cover 72 may be attached to the module housing 62 by a hinge and be openable to provide access to the interior of the module housing 62 for maintenance. When attached to the generator 24, a base portion 74 of the ECM 44 is located radially inward of the access cover 72 with respect to the central generator axis. The heat exchanger 58 forms part of the base portion 74 of the module housing 62 as shown in more detail in FIG. 8. In the present example, the removable cover portion 72 defines at least part of an outer surface 70 of the generator when the ECM 44 is in situ attached to the stator support frame 38.

Fluid interface connections 76 associated with the heat exchanger 58 extend from an end plate 78 of the module housing 62. When attached to the generator 24 as shown in FIG. 3, the fluid interface connections 76 extend from the end plate 78 in a direction substantially parallel to the central generator axis. The fluid interface connections 76 are releasably connectable to a fluid supply system 77 associated with the heat exchanger 58. Pipes 80 are in communication with the fluid interface connections 76 for carrying cooling fluid to and from the heat exchanger 58 in use.

Electrical interface connections 82 associated with the fan 60 are similarly disposed external to the end plate 78 of the module housing 62 such that electrical connections can be made without disassembling the ECM 44 or generator 24. The electrical interface connections 82 are releasably connectable to an electrical supply system 83 associated with the fan 60. In some examples, the ECM 44 further comprises a temperature sensor 85 and the electrical interface connections 82 therefore also comprise connections associated with the temperature sensor 85. Such electrical interface connections 82 are releasably connectable to an electrical supply system 83 associated with the temperature sensor 85. Internal electrical wiring (not shown) is provided to transfer power from the electrical interface connections 82 to the fan 60 and temperature sensor 85 (if present).

In this example the electric motor 63 forms part of the air mover sub-assembly 66. The electric motor 63 is accessible from the outside of the module housing 62 and is independently separable from the ECM 44 with the ECM 44 attached in situ to the stator support frame 38. The electric motor 63 can therefore be serviced in situ or replaced without requiring any disassembly of the generator 24 or ECM 44 whilst the remainder of the ECM 44 is attached to the stator frame 38.

In some examples, the electric motor 63 is a variable frequency drive motor. In such an example, the overall air flow within the generator 24 can be specifically controlled by individually controlling the variable frequency drives 63. The distribution of cooling within the generator 24 can be tailored by controlling the variable frequency drive 63 of each ECM 44 to reflect different loss distributions associated with leads and power connections. The variable frequency drives 63 may be controlled based on feedback from sensors in the ECM 44 and generator 24 such as the temperature sensors 85 mentioned above.

Figure 8:
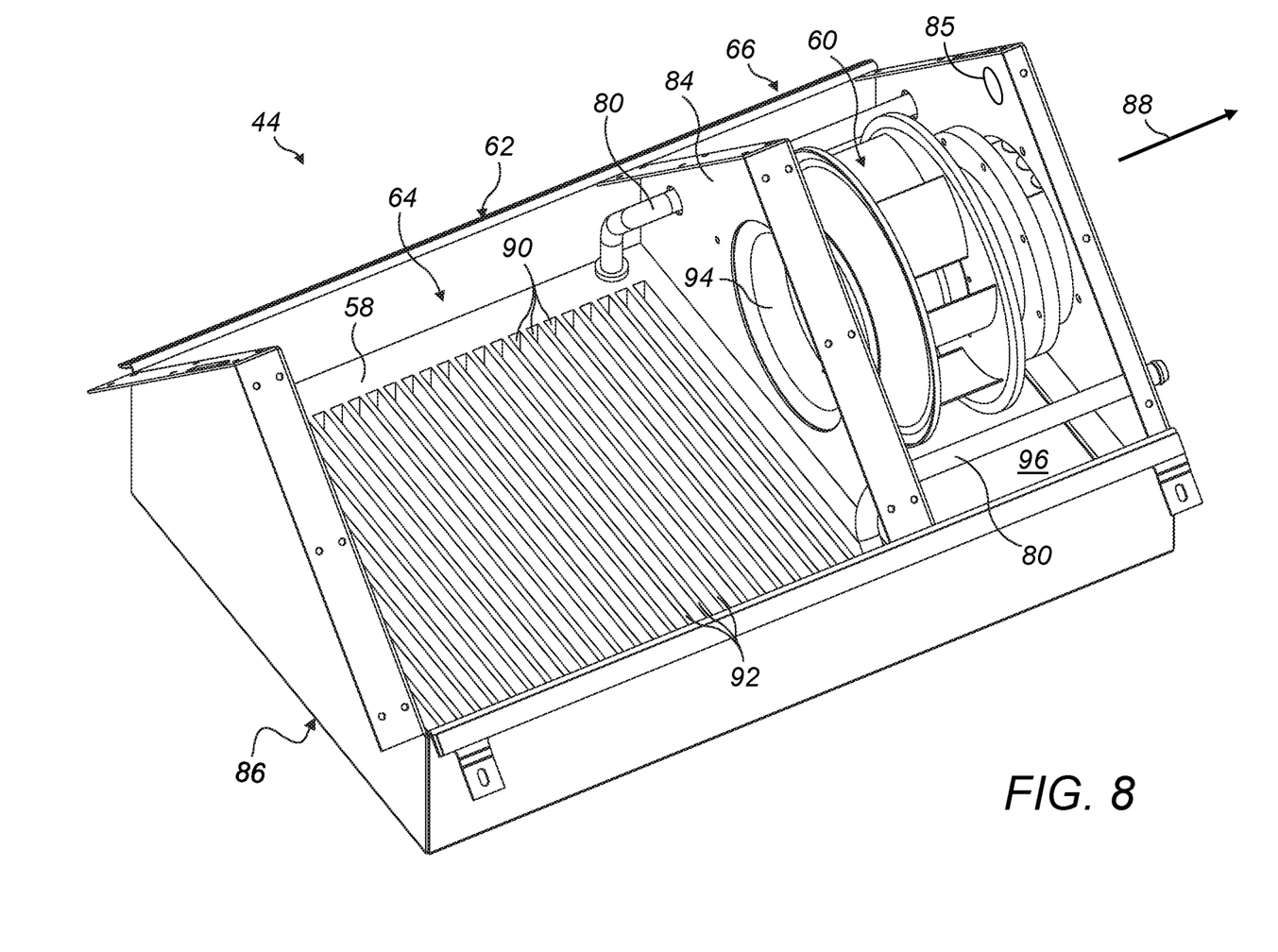
FIG. 8 is a schematic perspective view of the environmental conditioning module with an access cover removed.

FIG. 8 shows a schematic perspective view of the ECM 44 with the access cover 72 removed to reveal the interior of the module housing 62 and the components comprised within the ECM 44. The heat exchanger sub-assembly 64 comprises a liquid-to-air type heat exchanger 58. As discussed above, the heat exchanger sub-assembly 64 comprises fluid connections in the form of piping 80. The pipes 80 extend from the heat exchanger 58 through a partition wall 84 of the module housing 62 to the fluid interface connections 76.

As shown in FIG. 8, the heat exchanger 58 is substantially planar and forms part of an outer surface 86 of the module housing 62. In a fully assembled generator 24, the ECM 44 is attached to the stator support frame 38 so that the heat exchanger 58 forms part of a radially innermost surface 86 of the module housing 62 with respect to the central generator axis.

The air mover sub-assembly 66 is separable from the heat exchanger sub assembly 64 and can be separated therefrom whilst the remainder of the ECM 44 is attached to the stator support frame 38. The air mover sub-assembly 66 may be separated from the heat exchanger sub-assembly 64 by moving the air mover sub-assembly 66 in the direction of arrow 88. With the ECM 44 attached to the stator frame 38, the direction of arrow 88 is substantially parallel to the central generator axis and the air mover sub-assembly 66 is therefore separable from the heat exchanger sub-assembly 64 in the axial direction of the generator 24.

The fan 60 is arranged in the module housing 62 such that a rotational axis of the fan is substantially parallel to the central generator axis when the ECM 44 is attached to the stator frame 38. In use, the air mover 60 is operated to cause air from an interior 56 of the generator 24 to be drawn into the module housing 62 through the heat exchanger 58. Air is drawn through spaces 90 between cooling fins 92 of the heat exchanger 58 and into the module housing 62 before entering the air mover sub-assembly 66 via an air inlet cone 94. The centrifugal fan 60 then expels the cooled air, having been cooled by passing through the heat exchanger 58, through an aperture 96 in the module housing 62 to be returned to the interior 56 of the generator 24, thus forming a closed loop cooling system.

Figure 9:
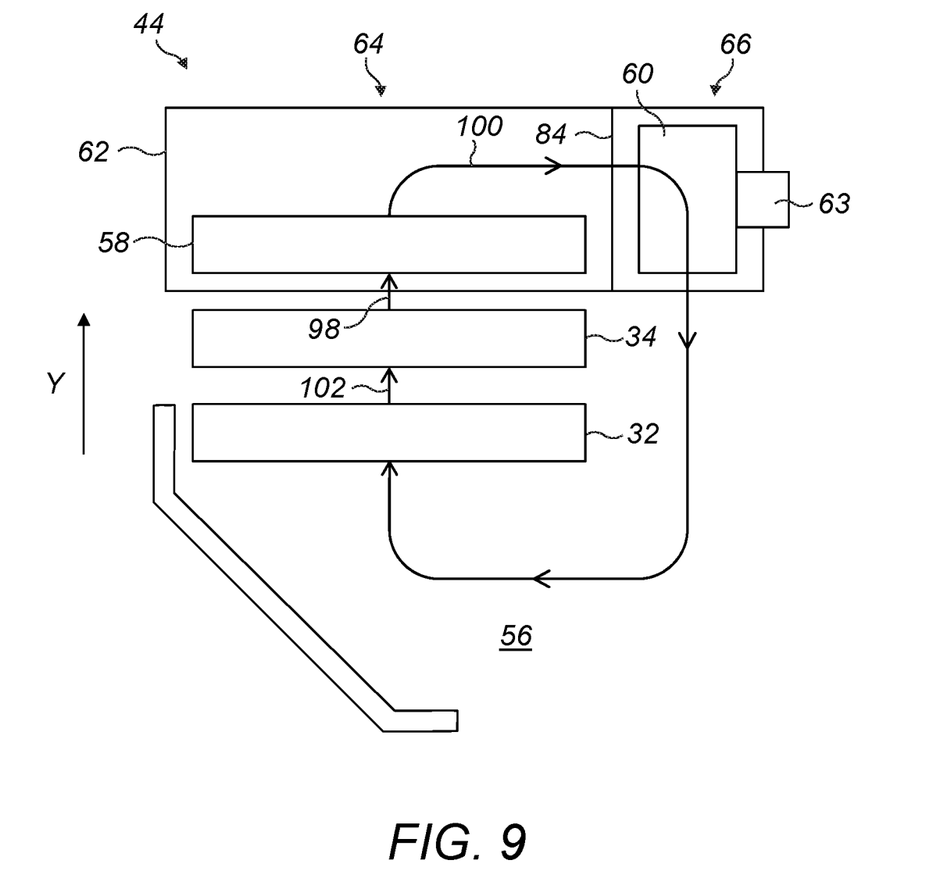
FIG. 9 is a schematic diagram of the flow of air within an environmental conditioning module and between other components of the generator.

FIG. 9 is a schematic diagram illustrating the closed-loop air flow path within one of the environmental conditioning modules 44 and through other components of the generator 24. The air flow path is illustrated by arrows 98, 100, 102. As described with reference to FIG. 9, warm air 98 heated by the rotor 32 and stator 34 of the generator 24 is drawn into the module housing 62 of the ECM 44 by the air mover 60. Air 98 is drawn into the module housing 62 through the heat exchanger 58, by means of which the air 98 is cooled. Cooled air 100 is drawn through the partition wall 84 into the air mover sub-assembly 66.

The cooled air 100 is expelled from the ECM 44 to the interior 56 of the generator 24 by the centrifugal fan 60 of the air mover sub-assembly 66. The cooled air 100 is directed to radially inner components of the generator with respect to the central generator axis. As such, the arrangement results in low pressure drops as the coolest air 100 leaving the ECM 44 is directed to an innermost surface of the rotor 32. The air-flow is further aided by the rotation of the rotor 32 in use. The rotation of the rotor 32 results in a degree of self-pumping in which air 100 in the interior region 56 is encouraged to flow in a radial direction Y outwards through the stator 34 and to the environmental conditioning module 44 by centrifugal force.

In an example wherein the rotor 32 comprises permanent magnets, it is of particular interest to ensure that generator components are cooled sufficiently as the magnets are particularly sensitive to heat and extended exposure to high temperatures can lead to accelerated deterioration thereof. In the arrangement shown schematically in FIG. 9, the cooled air 100 leaving the ECM 44 is incident on the rotor 32, and thereby on any permanent magnets, whilst the air 100 is at a low temperature, i.e. before providing cooling to other generator components such as the stator 34. After passing over the rotor 32 and any magnets attached thereto, air 102 flows through the stator 34 of the generator 24 to provide cooling to the stator core 36 and associated stator windings 42.

The invention claimed is:

1. A generator for a wind turbine defining a central generator axis, the generator comprising:
   a stator support frame; and
   at least one environmental conditioning module removably attached to the stator support frame, the at least one environmental conditioning module being self-contained within a module housing, wherein the at least one environmental conditioning module comprises:
   a heat exchanger and an air mover supported by and contained within the module housing;
   fluid interface connections associated with the heat exchanger, the fluid interface connections being releasably connectable to a fluid supply system associated with the heat exchanger; and
   electrical interface connections associated with the air mover, the electrical interface connections being releasably connectable to an electrical supply system associated with the air mover.

2. The generator of claim 1, wherein the at least one environmental conditioning module comprises a plurality of separable sub-assemblies comprising at least:
   a heat exchanger sub-assembly; and
   an air mover sub-assembly, wherein at least one of the sub-assemblies is independently separable from the at least one environmental conditioning module with the at least one environmental conditioning module attached in situ to the stator support frame.

3. The generator of claim 2, wherein at least one of the sub-assemblies comprises an electric motor for driving the air mover, wherein the electric motor is independently separable from the at least one environmental conditioning module with the at least one environmental conditioning module attached in situ to the stator support frame.

4. The generator of claim 3, wherein the electric motor forms part of the air mover sub-assembly.

5. The generator of claim 1, wherein the heat exchanger forms at least part of an outer surface of the module housing.

6. The generator of claim 5, wherein the heat exchanger is substantially planar, and wherein the at least one environmental conditioning module is positioned on the stator support frame so that the heat exchanger forms part of a radially innermost surface of the module housing with respect to the central generator axis.

7. The generator of claim 1, wherein the module housing comprises an access cover, wherein the access cover is removable or openable to provide maintenance access to an interior of the module housing.

8. The generator of claim 1, wherein the module housing forms at least part of an outer surface of the generator.

9. The generator of claim 1, wherein the generator is substantially cuboidal in shape, thereby defining six faces, wherein a first face of the generator is located at a driven end of the generator and wherein a second face is located at an opposing non-driven end of the generator, and wherein the at least one environmental conditioning module is located substantially at a vertex of the generator extending substantially between the first and second faces.

10. The generator of claim 9, wherein the at least one environmental conditioning module is located substantially at each vertex of the generator extending substantially between the first and second faces.

11. The generator of claim 1, wherein the heat exchanger is a liquid to air type heat exchanger and the air mover comprises a fan.

12. The generator of claim 11, wherein the fan is a centrifugal fan arranged within the module housing so that a rotational axis of the fan is substantially parallel to the central generator axis.

13. A method of cooling a generator for a wind turbine, the generator having features according to claim 1, the method comprising:
   operating the generator; and
   operating the air mover of the at least one environmental conditioning module to cause air from an interior of the generator to be drawn into the module housing through the heat exchanger and subsequently returned to the interior of the generator.

14. The method of claim 13, wherein airflow through the at least one environmental conditioning module forms a closed loop such that at least a portion of the air returned to the interior of the generator is drawn back into the module.

15. A wind turbine comprising a wind turbine tower, a nacelle rotatably coupled to the tower, a rotating hub mounted to the nacelle, and a plurality of wind turbine blades coupled to the hub, wherein the nacelle comprises a generator according to claim 1.

16. A generator for a wind turbine defining a central generator axis, the generator comprising:
   a stator support frame; and
   at least one environmental conditioning module removably attached to the stator support frame, wherein the at least one environmental conditioning module comprises:
     a heat exchanger and an air mover supported by a module housing;
     fluid interface connections associated with the heat exchanger, the fluid interface connections being releasably connectable to a fluid supply system associated with the heat exchanger; and
     electrical interface connections associated with the air mover, the electrical interface connections being releasably connectable to an electrical supply system associated with the air mover,
   wherein the at least one environmental conditioning module further comprises a temperature sensor and electrical interface connections associated with the temperature sensor, the electrical interface connections being releasably connectable to an electrical supply system associated with the temperature sensor.

* * * * *